C. PUETZ.
PASTE JAR.
APPLICATION FILED MAY 31, 1911.

1,048,873.

Patented Dec. 31, 1912.

Wittnesses.
C. L. Bronson
R. J. Holmden.

Inventor.
Charles Puetz
By Rich N. Manning
Attorney.

COLUMBIA PLANOGRAPH CO., WASHINGTON, D. C.

UNITED STATES PATENT OFFICE.

CHARLES PUETZ, OF KANSAS CITY, MISSOURI.

PASTE-JAR.

1,048,873. Specification of Letters Patent. Patented Dec. 31, 1912.

Application filed May 31, 1911. Serial No. 630,515.

*To all whom it may concern:*

Be it known that I, CHARLES PUETZ, a citizen of the United States of America, residing at Kansas City, in the county of Jackson and State of Missouri, have invented certain new and useful Improvements in Paste-Jars; and I do hereby declare that the following is a full, clear, and exact description of the invention, such as will enable others to make and use the same, reference being had to the accompanying drawing, forming a part of this specification.

The objects of the invention are: first, to maintain a humid atmosphere above the exposed surface of the paste, so as to keep the paste from hardening, and also to prolong the evaporation of the moisture; second, to indicate at all times the height of the water in the water receptacle; and third, to keep the cover of the jar hermetically closed.

The invention consists in the novel construction and combination of parts, such as will be first fully described and then specifically pointed out in the claim.

Figure 1:
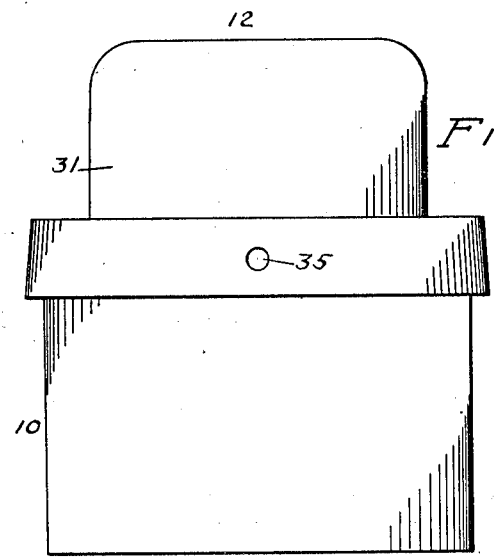
Figure 2:
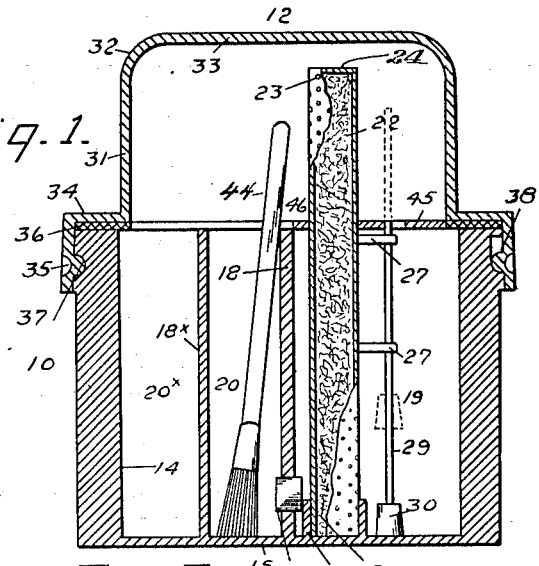
Figure 3:
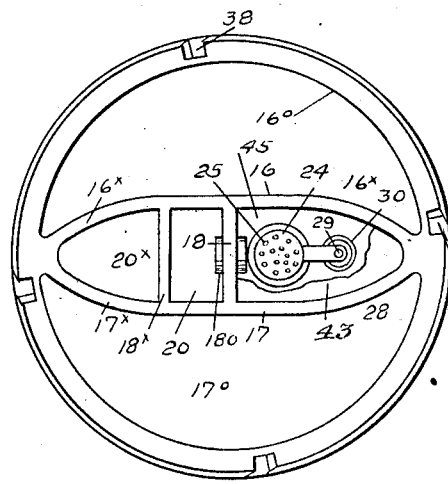
Figure 4:
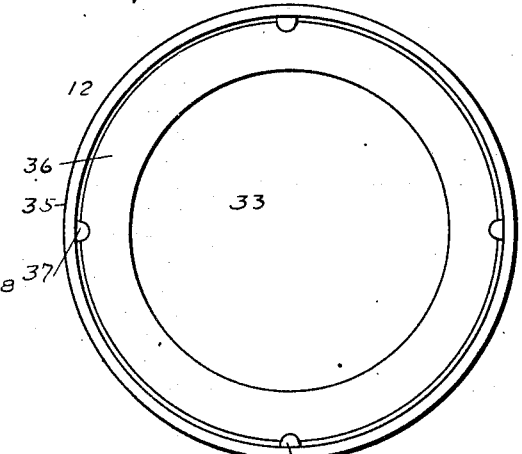
Figure 5:
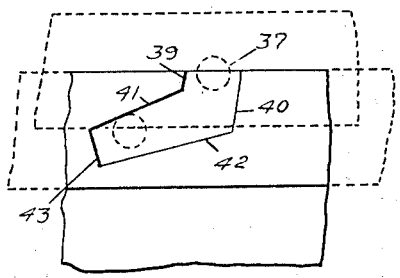

In the drawing: Figure 1. is a side view, in elevation, of the improved paste jar and its cover, the cover to the water receptacle being shown broken away. Fig. 2. is a vertical, sectional view of the same. Fig. 3. is a plan view of the paste jar, with the cover removed. Fig. 4. is a view of the cover in an inverted position. Fig. 5. is a detail, side view of portions of the cover and paste jar, showing the interlocking parts.

Similar numerals of reference indicate corresponding parts in all the figures of the drawing.

Referring to the drawing, 10 indicates the improved paste jar, and 12 its top removably secured thereto and in such a manner as to prevent the entrance of air, as further described. The jar 10 consists, as shown, of a cylindrical vessel or receptacle, of the proper dimensions to hold separate bodies of paste, one of which bodies is wholly used before the solidity of the other is broken, and an economic use made of the paste. The sides 14, and bottom 15, of the jar, are made or cast, in one piece, from suitable material, such as glass, the sides 14 being of considerable thickness, so that the paste is less susceptible to changes in temperature. Within the jar is an elliptical shaped receptacle composed of the vertical, parallel partition plates 16 and 17, forming the inner wall of the paste receptacle said partitions being spaced apart a short distance, for the purpose further described. The plates 16 and 17 are upon opposite sides of a line extending transversely to and diametrically through the sides 14, of the jar, the ends $16^x$, $17^x$, of the respective plates being bent inwardly in a curved line, and in juxtaposition and connected integrally with the inner surfaces of said sides 14. The lower portions of plates 16 and 17 are united integrally with the inner surface of the bottom plate 15, of the jar, the upper portions extending upward to the line of the upper surfaces of the sides 14 of the jar. Between the plates 16 and 17 are vertical partitions 18, $18^x$, extending in a transverse direction thereto and integrally connected with the said plates, and at their lower ends with the inner surface of the bottom 15, the upper end of the partitions being upon a line parallel with the upper surface of plates 16 and 17, the partition 18 being located in a central position in the jar, and the partition $18^x$ located between said portion and the ends $16^x$ and $17^x$ of the jar. Upon the opposing sides of the partition plate 18 are the receptacles 19 and 20, receptacle 19 being for water, receptacle 20 being for the paste brush, in which it is kept moist, and receptacle $20^x$ for the reception of the brush when not in use. Between the outer surfaces of plates 16 and 17 and the inner surfaces of the sides 14, of the jar, are receptacles $16°$ and $17°$, for the paste. With the inner surface of the bottom plate 15 of the jar at a point a short distance from the transverse partition plate 18, is connected a socket 21, which extends upwardly a short distance in height. Within the socket 21 is extended the lower end of a capillary device for raising the moisture, consisting of a tube 22, of suitable material, which is perforated at 23 in its sides, the perforations being extended around the tube and continued in series, spaced slight distances apart, to the upper end of the tube, which end extends in height a considerable distance above a line horizontal with the upper surface of the partitions 16, 17 and 18. Upon the said upper end of tube 22 is an integrally formed cap plate 24, which is perforated at 25.

Within the tube 22 is a wick, composed of sponge 26, extending from its lower end to the cap 24, for conducting the water upwardly in the tube. With the outer surfaces of the tube 22, in the direction of the inwardly-curved sides 16ˣ 17ˣ, of the partition plates 16 and 17 are connected in any suitable manner and rigidly the inner ends of the horizontal plates or supports 27, the outer ends of which plates extend outwardly a short distance. One of the plates 27 is located at a point a slight distance below a line horizontal with the upper ends of partitions 16 and 17, and the other plate 27 is located about one-half the distance downwardly from the upper end of the tube and the lower end of said tube in socket 21. These plates 27 extend a short distance outwardly from tube 22, and are perforated at 28, in a vertical direction, one perforation in one plate being vertically in line with the perforation in the other plate. Within these perforations 28 is a rod or stem 29, upon the lower end of which stem is a float 30, composed of cork, as shown, the device forming an indicator of the height of the water in receptacle 19, the float always being upon the surface of the water. In the lower portion of partition 18 is an opening in which is a mineral percolator 18°, admitting water from receptacle 19 to receptacle 20. The top 12, of the paste jar, which is made preferably from metal plate, consists of a cylindrical shell or dome, which extends in height from the line of the upper portion of the sides 14, of the paste jar, a considerable distance above the line of the upper end of tube 22, the lines of the inner surface of the sides 31 of the top being concentric with the lines of the inner surface of the sides 14, of the jar. From said sides 31, of the top 12, the upper portion of said sides are curved at 32 inwardly, and thence extended horizontally, to form the top plate 33. The lower portions of the sides 31 are bent at right angles and extended outwardly upon the upper surface of said sides 14, of the paste jar to the line of the outer surface of the said jar, forming a rim 34, thence bent at right angles and extended downwardly a short distance on the outer surface of the jar, forming a flange 35, which inclines outwardly in a slight degree. On the inner surface of the rim 34 is a gasket 36, composed of air-excluding material, such as rubber, and connected firmly with the rim, the gasket fitting closely upon the upper surface of the sides 14, of the jar.

Upon the inner surface of the flange 35, of the top 12, and near the lower portion of said flange is an inwardly punched locking lug 37, circular in form and extending inwardly a slight distance from said flange. From the line of the upper portion of the side walls of the jar the outer portion of said side wall is inclined outwardly and downwardly. In this portion of the side wall 14, of the jar, is a locking groove 38. This groove in width is slightly in excess of the diameter of the lug 37, and extends from the line of the upper surface of the side 14 downwardly. The opposite sides 39 and 40 of the grooves extend downwardly to a point, the sides 40 extending downwardly more than twice the distance of the portion 39. The sides 41 and 42 of the lower portion of the groove are bent at an angle to the sides 39 and 40, and are extended upon a slight downwardly-inclined plane, terminating at 43 (see Fig. 5). The locking lug 37, in the flange 35, of the cover 12, is caused to enter the upper portion of the groove 38 and move downwardly in contact with the sides 41 and 42, drawing or wedging, in the meantime, upon the rim 34, and forcing the gasket 36 firmly upon the upper surface of the sides 14, of the jar, thus securing the top to the jar and effectually excluding the air from the interior of the jar. A number of lugs 37 are formed in the flange 35, in the circular direction thereof, and spaced apart the requisite distance from each other, and corresponding grooves 38 having sides 41 and 42 are made in the outer surfaces of the jar, as heretofore described, the lugs 37 acting to draw the rim forcibly upon the gasket 36.

44 indicates an ordinary paste brush, which is placed within the receptacle 20 when not in use. In the upper portion of the receptacle 19 is shown a removable cover 45, of rubber, having an opening 46, for the passage of tube 22.

In the preparation of the paste jar as described for the trade, top 12 is first removed, and the receptacles 16° 17° are filled with prepared paste, such as is employed for literary purposes, label affixers, and for numerous other purposes, and in which an adhesive substance is used. Water is then supplied to the receptacle 19, which enters the tube 22 through the perforations 23, and the sponge 26 becomes saturated therewith, the float 30 rising to the top of the water and indicating the height of the water in the receptacle 19. The water which percolates through percolator 18°, to afford moisture for the brush is in drops only, so that the brush may be kept moistened, but does not at any time rise in height in the receptacle 20, to the line of the percolator. The top 12 is then replaced, the lugs 37, on the flange 35, of the top, entering the grooves 38, as far downwardly as the meeting of the sides 39 and 40, of said groove with the sides 41 and 42. In this position of the lugs 37, the cover is given a partial turn to the right, the lugs 37 moving in contact with the downwardly and forwardly-inclined sides 41 and 42, to the point 43, of the groove, thus drawing upon and compressing the gasket 36, as shown in the rim 34, close to the upper surfaces of the sides of the jar. The moisture in the saturated sponge 26 now rises in the tube 22 by capillary attraction, and is dispensed through the perforations 23, the air within the cap or dome becomes humid, and this humid atmosphere keeps the paste in a viscid condition and in condition for immediate use and for a longer time than heretofore, the evaporation which occurs lowering the water in the receptacle 19, and when the cover 12 is removed the stem 29 indicates the quantity remaining in the receptacle.

The locking devices for the top of the jar prevent the top from being removed until a partial movement of the top is made rotatively to the left, and as the flange 35 fits quite closely to the outer surfaces of the side 14, of the jar, a slight degree of force is required to remove the cover from the jar.

The top 24 to the tube 22 may be employed or not, as preferred, its use, however, prevents dust from reaching and clogging the sponge. The tube 22 may be removed from the socket 21, when required, in order to replenish the tube with sponge or such other material as may be substituted therefor.

The novel features of my invention obviates the spilling of the water in the upsetting of the jar which occurs in the ordinary forms of paste jars employing a water receptacle.

Such modifications may be employed as are within the scope of the appended claim.

Having fully described my invention, what I now claim as new and desire to secure by Letters Patent is:

The combination in a paste jar with the inner surfaces of the sides and bottom of the jar of transverse partitions spaced apart and connected integrally with said side and bottom of the jar between the outer surfaces of which partitions and the wall of the jar are formed separate receptacles for the paste a partition connected with the inner surfaces of said transverse partitions separating the space into separate water holding compartments having an opening in the lower portion thereof, and a mineral liquid percolator within said opening.

CHARLES PUETZ.

Witnesses:
 F. D. GLORE,
 ANNIE L. GREER.

---

Copies of this patent may be obtained for five cents each, by addressing the "Commissioner of Patents, Washington, D. C."